US010648593B2

(12) United States Patent
Trefz et al.

(10) Patent No.: US 10,648,593 B2
(45) Date of Patent: May 12, 2020

(54) PIPE CLAMP

(71) Applicant: Georg Fischer Wavin AG, Schaffhausen (CH)

(72) Inventors: Oliver Trefz, Bonndorf (DE); Jonas Huessy, Neunkirch (CH); Dirk Petry, Feuerthalen (CH)

(73) Assignee: GEORG FISCHER WAVIN AG, Schaffhausen (CH)

( * ) Notice: Subject to any disclaimer, the term of this patent is extended or adjusted under 35 U.S.C. 154(b) by 0 days.

(21) Appl. No.: 16/249,950

(22) Filed: Jan. 17, 2019

(65) Prior Publication Data
US 2019/0226607 A1 Jul. 25, 2019

(30) Foreign Application Priority Data
Jan. 19, 2018 (EP) .................................. 18152434

(51) Int. Cl.
| F16L 3/00 | (2006.01) |
| F16L 3/137 | (2006.01) |
| F16L 47/03 | (2006.01) |
| F16L 47/30 | (2006.01) |
| F16L 47/34 | (2006.01) |
| F16L 41/06 | (2006.01) |
| F16L 41/12 | (2006.01) |
| F16B 2/08 | (2006.01) |
| F16B 2/18 | (2006.01) |
| F16L 3/12 | (2006.01) |

(52) U.S. Cl.
CPC ................ *F16L 3/137* (2013.01); *F16B 2/08* (2013.01); *F16B 2/185* (2013.01); *F16L 3/1211* (2013.01); *F16L 41/065* (2013.01); *F16L 41/12* (2013.01); *F16L 47/03* (2013.01); *F16L 47/30* (2013.01); *F16L 47/345* (2013.01)

(58) Field of Classification Search
CPC .... H02G 3/32; F16L 3/233; F16L 3/00; F16L 3/26; F16L 47/345; F16L 3/137; F16L 55/1715
USPC .......... 248/65, 74.1, 74.2, 74.3, 74.4, 218.4, 248/219.1, 219.3, 219.4, 230.1
See application file for complete search history.

(56) References Cited

U.S. PATENT DOCUMENTS

| 793,049 A | 6/1905 | Buffelen | |
| 2,504,881 A * | 4/1950 | Russell | F16L 55/1715 138/99 |

(Continued)

FOREIGN PATENT DOCUMENTS

| DE | 4437410 A1 | 4/1996 |
| WO | WO 2016023540 A1 | 2/2016 |

*Primary Examiner* — Steven M Marsh
(74) *Attorney, Agent, or Firm* — Leydig, Voit & Mayer, Ltd.

(57) ABSTRACT

A pipe clamp for a main pipe conveying a medium. The pipe clamp includes a saddle member and bearing elements, wherein the bearing elements are arranged on the saddle member. The pipe clamp further includes a tension unit, wherein the tension unit comprises at least one band for encircling the main pipe, a band linkage, and a clamping lever. The band linkage and the clamping lever are each arranged at one end of the at least one band and are opposite one another. An extension is arranged on the clamping lever, and the extension is configured to be removed from the clamping lever after the tension unit is firmly clamped on the main pipe.

18 Claims, 5 Drawing Sheets

(56) References Cited

U.S. PATENT DOCUMENTS

| | | | | |
|---|---|---|---|---|
| 3,564,671 | A * | 2/1971 | Straus | F16L 21/06 |
| | | | | 24/270 |
| 5,351,368 | A * | 10/1994 | Borst | B24B 55/052 |
| | | | | 24/270 |
| 5,598,995 | A * | 2/1997 | Meuth | E21B 17/1035 |
| | | | | 24/273 |
| 10,024,475 | B2 | 7/2018 | Jungmann et al. | |
| 2011/0290360 | A1 * | 12/2011 | Robinson | F16L 55/1715 |
| | | | | 138/99 |
| 2012/0291232 | A1 | 11/2012 | Nakamura | |
| 2013/0068900 | A1 * | 3/2013 | Heath | F16L 3/085 |
| | | | | 248/70 |
| 2016/0039605 | A1 * | 2/2016 | Bowles | B65G 7/12 |
| | | | | 294/15 |

* cited by examiner

PIPE CLAMP

CROSS REFERENCE TO RELATED APPLICATIONS

This application claims benefit to European Patent Application No. EP 18 152 434.9, filed Jan. 19, 2018, which is incorporated by reference herein.

FIELD

The invention relates to a pipe clamp, in particular a pipe saddle clamp, for a main pipe, preferably of plastic, conveying a medium and comprising a saddle member, bearing elements, wherein the bearing elements are arranged on the saddle member, and preferably formed integrally with the saddle member, a tension unit wherein the tension unit comprises at least one band for encircling the main pipe, a band linkage and a clamping lever, wherein the band linkage and the clamping lever are each arranged at one end of the band or bands, and are opposite one another.

BACKGROUND

Pipe clamps of this kind mostly serve to connect outflowing pipes of main pipes and are as a rule fixedly clamped on the main pipe, whether as pipe clamps, which are subsequently welded, or as pipe clamps which are fixedly tensioned only on the main pipe.

WO 2016/023540 A1 discloses a saddle fitting which is fastened on the main pipe by means of a clamping band. A sliding profile is located outside on the clamping lever or on the tension device of the clamping lever in which the clamping band is mounted, and the sliding profile makes it possible to tension the clamping band since, by turning the clamping lever or sliding profile, an area of the sliding profile spaced further away from the axis of rotation of the band end appears between the bearing shell and the clamping band and thus spaces out the bearing shell and the clamping band further away from one another.

The drawback here is that the tensioning distance becomes very short and the change in length from the loose clamping band or narrow area of the sliding profile to the tightened clamping band or the wide or further distant area of the sliding profile is small whereby fastening the saddle fitting on the main pipe is rather difficult since, as a result of the relatively precise band length which allows no large pipe tolerance, hanging the clamping lever in the bearing shell is difficult.

DE 44 37 410 A1 discloses a sealing device for sealing a pipe leak wherein a compress is fixed by means of a quick clamp device over a leak which is to be sealed. The device comprises a long tensioning distance whereby this sealing device can be used on pipes of different diameters. So that a device of this kind can be fastened, however, high forces are required to turn round the clamping lever. This is counteracted by means of an additional tension spring wherein this has the drawback that as a result of the tension spring which is additionally required the device contains several parts and is then in turn more expensive to manufacture and assemble.

SUMMARY

In an embodiment, the present invention provides a pipe clamp for a main pipe conveying a medium. The pipe clamp includes a saddle member and bearing elements, wherein the bearing elements are arranged on the saddle member. The pipe clamp further includes a tension unit, wherein the tension unit comprises at least one band for encircling the main pipe, a band linkage, and a clamping lever. The band linkage and the clamping lever are each arranged at one end of the at least one band and are opposite one another. An extension is arranged on the clamping lever, and the extension is configured to be removed from the clamping lever after the tension unit is firmly clamped on the main pipe.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
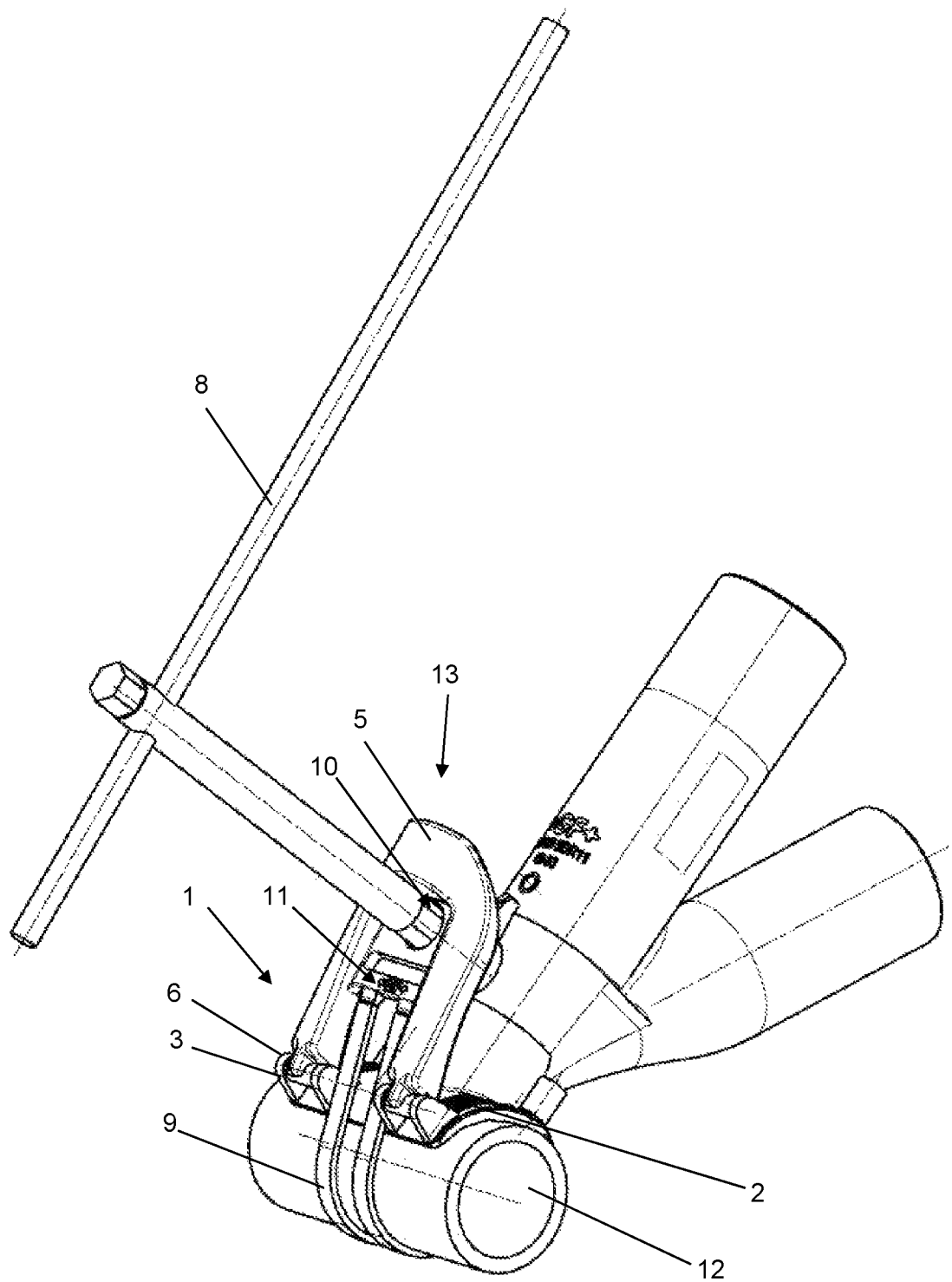
FIG. 1 shows a three-dimensional view of a pipe clamp according to an embodiment of the invention with the extension arranged thereon.

Embodiments of the invention provide pipe clamps as well as their tension units, and a manufacturing process connected therewith, which enable an economic production, as well as a pipe clamp which has sufficient tensioning distance to allow for pipe diameter tolerances but which can nevertheless be easily clamped and easily fitted.

Embodiments of the invention provide for an extension to be arranged on the clamping lever on the pipe clamp wherein the extension is preferably designed as a separate part wherein the extension can be removed from the clamping lever after the tension unit is firmly clamped on the main pipe.

Pipe clamps according to embodiments of the invention, in particular pipe saddle clamps for a main pipe conveying a medium, are preferably made from plastic. The pipe clamps include a saddle member with bearing elements arranged thereon. The bearing elements serve to mount the tension unit wherein the bearing elements are arranged on the saddle member and the saddle member is formed as a part or in one piece.

The saddle member preferably has on the inner support side a heated wire winding in order to be welded firmly to the main pipe.

The pipe clamps moreover include a tension unit wherein the tension unit comprises at least one band for looping round the main pipe, a band linkage and a clamping lever. The band linkage and the clamping lever are each arranged at the ends of the band and are opposite one another. The band or bands are fastened on the clamping lever so that when the clamping lever is moved from the mounting position or non-tension position into the end position of the clamping lever, the distance between the band fastening on the clamping lever and the band linkage on the opposite side is clearly increased, whereby the pipe clamps can also be fastened on main pipes which are subject to a large tolerance range in relation to the outer diameter. In order to tension the tension unit, it is necessary as a result of the large tensioning distance to set a high torque around the clamping lever. So that this is also possible when applying a small force, an extension is arranged on the clamping lever. The extension is removed again from the clamping lever after the tension process and can be used for other pipe clamps. The extension can thus be used multiple times. Through the extension the distance between the axis of rotation of the clamping lever and point where the force is introduced for moving round the lever is enlarged whereby a lower force is required for the same torque which is required. The force is furthermore defined by the modulus of elasticity of the band or bands which are preferably made from plastic, as well as by their geometry which also has an effect on the force required.

According to embodiments of the invention, a conventional hexagon key or socket wrench is used as the extension since this is generally always present with such assembly work.

The extension is preferably fastened on the clamping lever by screw or plug-in action which enables a simple quick fastening and the extension can be used on further pipe clamps and clamping levers. In order to enable this the extension preferably has a thread or a multi-angled edge which is received by the mounting in the clamping lever. The high torque which is required to firmly clamp the tension unit arises as a result of the long tensioning distance, that is, in the released state the band or bands is/are loose so that even main pipes which lie in the upper pipe tolerance range can be encircled without problem. Through the clamping lever or the band fastening on the clamping lever and the axis of rotation which is formed by the bearing of the clamping lever, a distance is predetermined in between, which produces such a large tensioning distance and correspondingly requires a high torque, which however in turn with the aid of the extension which forms a long space between the axis of rotation and the force introduction point, reduces the force required.

An advantageous configuration of the present invention exists where the bearing elements mounted on the saddle member are formed on one side as bearing bolts and on the opposite side as bearing shells, wherein another type of bearing would also be conceivable. It is thus possible that the band linkage is inserted on one side of the saddle member into the bearing shells and on the other side the brackets of the clamping lever engage round the bearing bolts about which the clamping lever is pivoted, and these thereby serve equally as the axis of rotation.

Consequently, it is advantageous that the clamping lever has brackets for engaging round the bearing bolts wherein other types of bearing are also conceivable. Through this configuration of the clamping lever the arrangement of the clamping lever can also be easily converted to the saddle member or to the bearing bolt.

The brackets preferably loop round the bearing bolt at a loop angle of more than 180°.

The tension unit preferably comprises one to four bands which loop round the main pipe; two bands are particularly preferred which are arranged on the tension unit. The bands run parallel to one another and pass at the ends into the clamping lever and on the other side into the band linkage, wherein the band linkage is preferably formed as an axle wherein the axle preferably has a cylindrical shape.

A possible configuration of the invention is where the one end of the band or the one ends of the bands is/are arranged on the band fastening of the clamping lever, wherein the band fastening is spaced from the brackets which engage round the bearing elements or bearing bolts on the saddle member and serve as the axis of rotation. The lever action is defined by the distance between the band fastening on the clamping lever and the axis of rotation which is formed by the brackets on the bearing bolt. The band end or ends is/are connected to the clamping lever through injection moulding plastics which forms the clamping lever, or are formed integral therewith. Alternatively, the bands can also be screwed, rivetted or clamped onto the clamping lever and the band linkage. The band linkage is correspondingly arranged at the opposite band ends and is likewise formed by injection moulding plastics or by one of the aforementioned fastening alternatives. The tension unit is designed in one piece when injection moulding the band ends with plastics to form a clamping lever and a band linkage which is preferably formed as an axle.

As a further possible configuration, the complete tension unit can be formed as a one-piece injection moulded part by injection moulding the band and/or bands as well.

It is advantageous that the fastening of the band or bands on the clamping lever has a distance of at least 15 mm from the brackets or axis of rotation.

A mounting is preferably arranged on the clamping lever wherein the mounting serves to receive the extension. The mounting is preferably cylindrical. When the clamping band is tensioned the mounting likewise serves as a stop so that the clamping lever can only be moved up to a certain position which is defined as the end position. If the clamping lever were to be pivoted further beyond this position the band tension would in turn be reduced which would not be desired. As a result of the mounting, the extension can be simply fastened on the clamping lever and removed again after the tension process and used again for a further pipe clamp. The indentation or opening in the mounting for receiving the extension is preferably designed for form-fitting engagement. It is more particularly designed as a multi-angle or thread so that a mounting is ensured which is secured against rotation, wherein a circular cross-sectional surface is also conceivable.

It has been seen to be advantageous if the band linkage is designed as an axle and is arranged in the bearing shells which are arranged on one side of the saddle member. The bearing shells preferably comprise axial stops. This ensures optimum alignment of the bands on the external diameter of the main pipe when tensioning the tension unit.

Embodiments according to the invention further provide for the tension unit to be designed in one piece and the clamping lever and the band linkage are injection moulded on the band or bands or at the band ends by means of a plastic injection moulding process.

The advantageous embodiments previously mentioned in relation to the pipe clamp are likewise to be used for the tension unit where they relate to the tension unit and to the method for the manufacture thereof.

Figure 2:
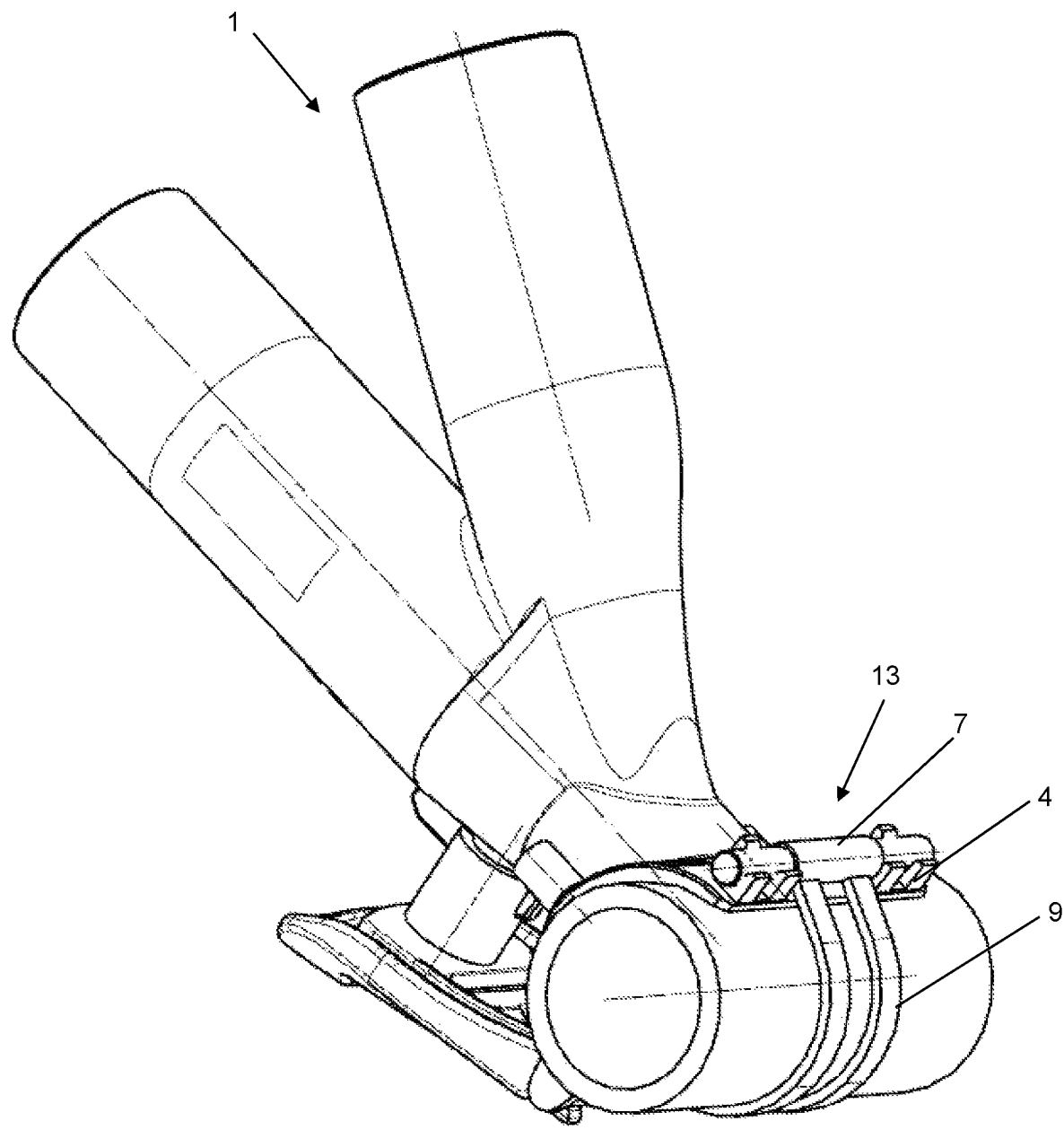
FIG. 2 shows a three-dimensional view of a pipe clamp according to an embodiment of the invention seen from the side of the band linkage.
Figure 3:
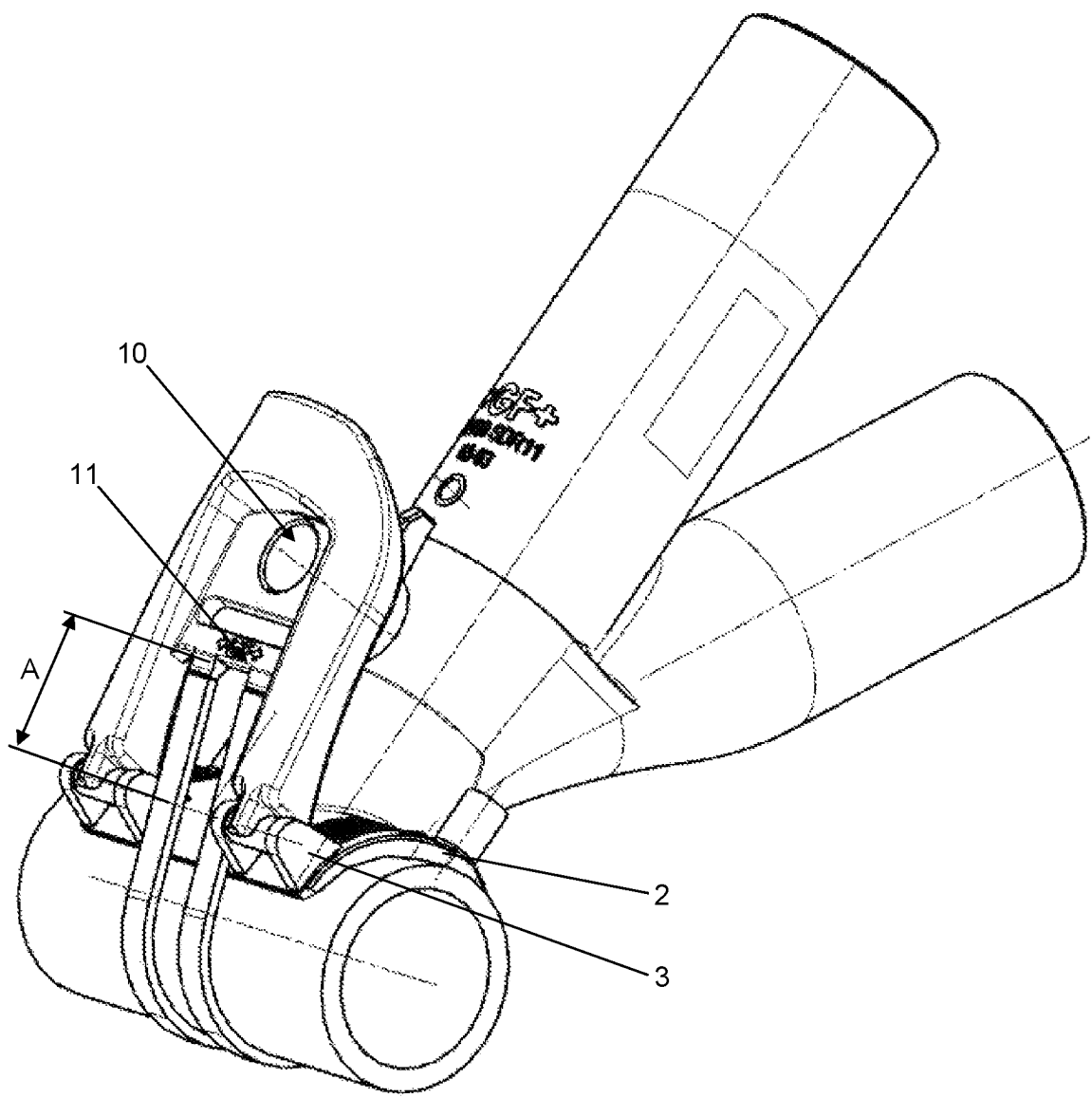
FIG. 3 shows a three-dimensional view of a pipe clamp according to an embodiment of the invention in a tensioned state wherein the extension was already removed.

The drawing illustrated in FIG. 1 shows a three-dimensional illustration of a pipe clamp 1 according to the invention with the extension 8 for firmly tensioning the tension unit 13. The pipe clamp 1 is fastened on a main pipe 12 and is fixed by means of the tension unit 13. The saddle member 2 is formed, preferably in one piece, with the bearing elements 3, 4 arranged thereon. The bearing elements 3, 4 have on one side of the saddle member 2 the form of a bearing shell 4, visible in FIG. 2, and on the other side the form of a bearing bolt 3. Obviously other configurations would also be conceivable for a bearing element or bearing.

Figure 4:
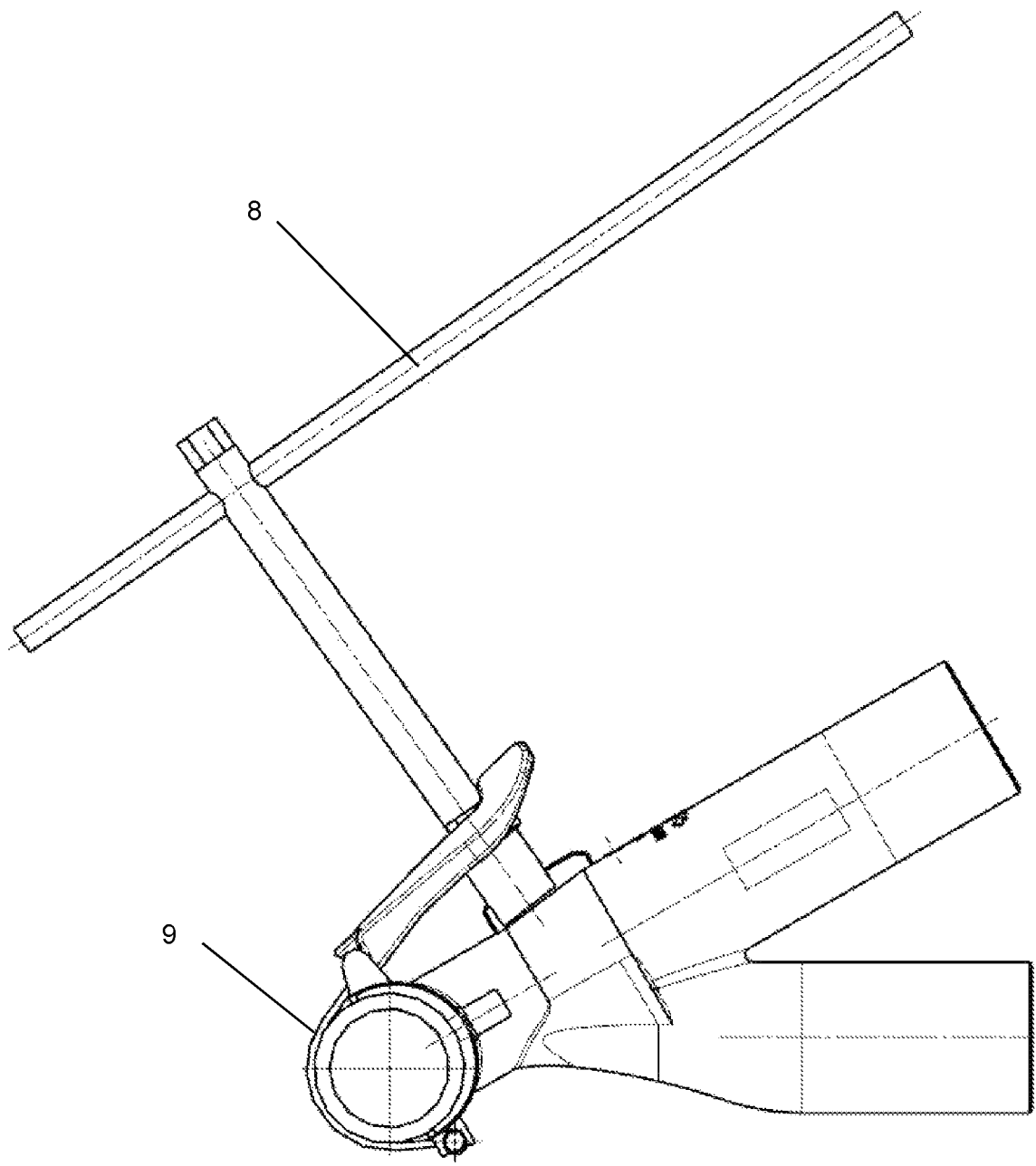
FIG. 4 shows a side view of a pipe clamp according to an embodiment of the invention in a tensioned state.
Figure 5:
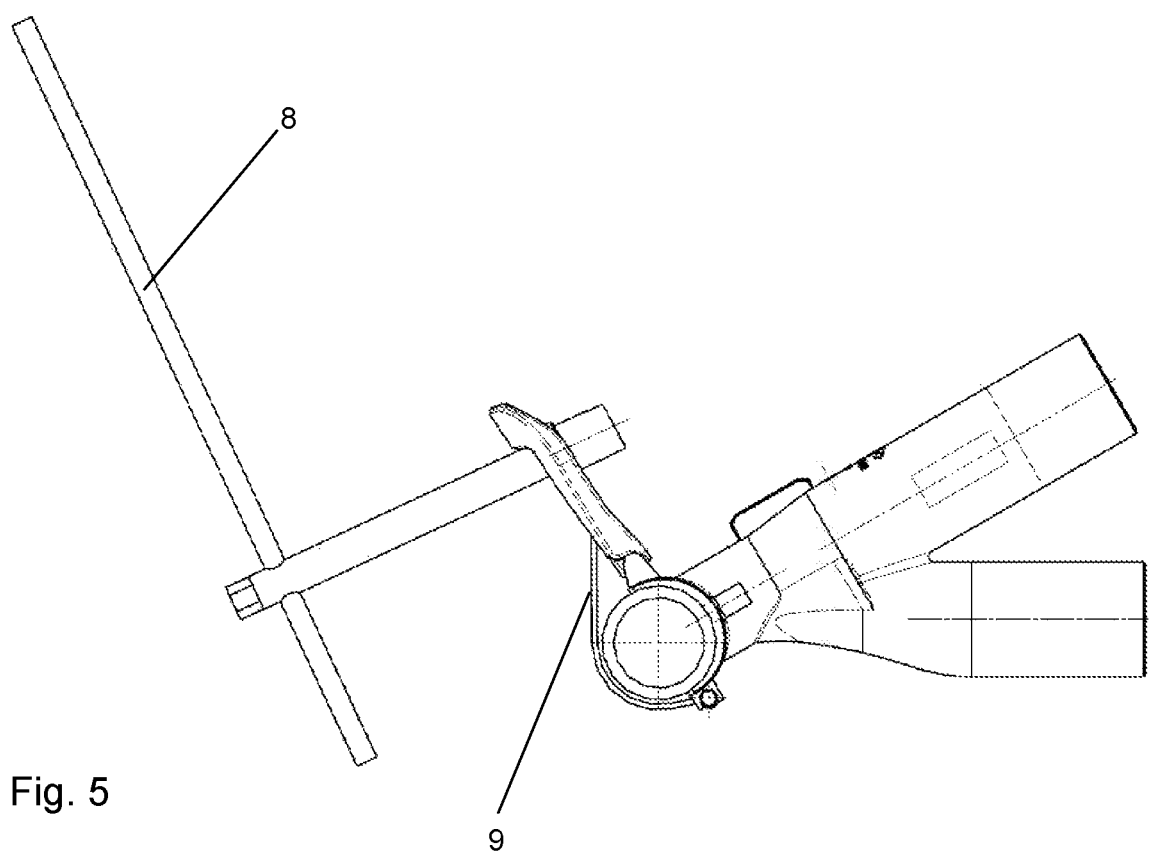
FIG. 5 shows a side view of a pipe clamp according to an embodiment of the invention in a non-tensioned state.

The tension unit 13 contains at least one band 9 wherein in the illustrated embodiment two bands 9 are provided running parallel to one another. The clamping lever 5 and the band linkage 7 opposite this are arranged at the ends of the bands 9. The tension unit 13 is formed as one part since the band ends are injection moulded with the plastics of the clamping lever 5 and the band linkage 7. The band ends merge at the band fastening 11 into the clamping lever 5 and the opposing band ends merge into the band linkage 7. The brackets 6 of the clamping lever 5 serve to mount the clamping lever 5 on the bearing elements 3 and the bearing bolts 3 respectively. The distance A between the bearing bolts 3 or the axis of rotation 3 and the band fastening 11 on the clamping lever 5 is made relatively large in order to have a large tensioning distance and also to enable looping round pipe diameters which are at the upper limit of the norm. This enables simple mounting of the band linkage 7 which is preferably designed as an axle since the bands 9 are designed correspondingly long, which is easily visible in FIG. 5 in which the band 9 is shown loose. Obviously the clamping lever 5 can be folded even further downwards in order to be able to loop the bands 9 round the main pipe 12 as easily as possible when fastening the pipe clamp 1. However this large distance A which produces such a long tensioning path requires a high torque to move round the clamping lever 5 or until the clamping lever 5 has tipped beyond the dead point, as shown in FIG. 5. In order to reduce the force required here, an extension 8 is arranged on the clamping lever 5 whereby the distance to the axis of rotation 3 is increased and a reduction in the force is allowed without affecting the torque. The extension 8 is designed as a separate part and can be removed from the clamping lever 5 after the tension process and then used again when installing the next pipe clamp 1. The extension 8 is preferably arranged in the mounting 10 on the clamping lever 5 and interacts there with form-fitting engagement. The mounting 10 is preferably designed as a hollow cylinder and the length is defined so that it serves as a restriction for the clamping lever 5. This means that the clamping lever 5 can only be moved up to a certain position until the mounting 10 meets the pipe clamp 1, as shown clearly in FIG. 4. This prevents the clamping lever 5 from moving out beyond this setting of the end position so that the tension of the bands cannot be reduced again.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Pipe clamp
2 Saddle member
3 Bearing element, bearing bolt, axis of rotation
4 Bearing element, bearing shell
5 Clamping lever
6 Bracket
7 Band linkage, axis
8 Extension
9 Band, bands
10 Mounting
11 Band fastening on the clamping lever
12 Main pipe
13 Tension unit
A Distance

What is claimed is:

1. A pipe clamp for a main pipe conveying a medium, comprising:
    a saddle member;
    bearing elements, wherein the bearing elements are arranged on the saddle member; and
    a tension unit, wherein the tension unit comprises at least one band for encircling the main pipe, a band linkage, and a clamping lever, wherein the band linkage and the clamping lever are each arranged at one end of the at least one band and are opposite one another,
    wherein an extension is arranged on the clamping lever, wherein the extension is configured to be removed from the clamping lever after the tension unit is firmly clamped on the main pipe, and
    wherein the clamping lever comprises brackets configured to engage around the bearing elements.

2. The pipe clamp according to claim 1, wherein the extension is fastened on the clamping lever by screw-in or push-fit action.

3. A pipe clamp for a main pipe conveying a medium, comprising:
    a saddle member;
    bearing elements, wherein the bearing elements are arranged on the saddle member; and
    a tension unit, wherein the tension unit comprises at least one band for encircling the main pipe, a band linkage, and a clamping lever, wherein the band linkage and the clamping lever are each arranged at one end of the at least one band and are opposite one another,
    wherein an extension is arranged on the clamping lever, wherein the extension is configured to be removed from the clamping lever after the tension unit is firmly clamped on the main pipe, and
    wherein the bearing elements arranged on the saddle member are formed on one side as bearing bolts and on the opposite side as bearing shells.

4. The pipe clamps according to claim 1, wherein the brackets encircle the bearing element over more than 180°.

5. The pipe clamp according to claim 1, wherein the at least one band comprises between one and four bands arranged on the tension unit and encircling the main pipe.

6. The pipe clamp according to claim 1, wherein one end of the at least one band is arranged on a band fastening of the clamping lever,
wherein the band fastening is arranged at a distance from the brackets, and
wherein the brackets serve as an axis of rotation.

7. The pipe clamp according to claim 6, wherein the band fastening on the clamping lever has a distance of at least 15 mm from the brackets or the axis of rotation.

8. The pipe clamp according to claim 1, wherein a mounting is arranged on the clamping lever, wherein the mounting is configured to mount the extension.

9. The pipe clamp according to claim 6, wherein the band fastening is formed as an axle and is arranged in bearing shells arranged on one side of the saddle member.

10. The pipe clamp according to claim 1, wherein the tension unit is formed in one piece, wherein the band linkage and the clamping lever are arranged by injection moulding at the band ends or the complete tension unit is formed as an injection moulded part inclusive of the at least one band.

11. The pipe clamp according to claim 1, wherein the at least one band of the tension unit is fastened in a demountable manner on the band linkage and on the clamping lever.

12. A method for manufacturing a tension unit of a pipe clamp for a main pipe, wherein the tension unit comprises at least one band for encircling the main pipe, a band linkage, and a clamping lever, the method comprising:

injection molding the clamping lever and the band linkage on the at least one band or at the band ends by a plastic injection molding process, or manufacturing the complete tension unit, inclusive of the at least one band, by injection molding,
wherein an extension is arranged on the clamping lever,
wherein the extension is configured to be removed from the clamping lever after the tension unit is firmly clamped on the main pipe,
wherein the band linkage and the clamping lever are each arranged at one end of the at least one band and are opposite one another, and
wherein the at least one band of the tension unit is fastened in a demountable manner on the band linkage and on the clamping lever.

13. The pipe clamp according to claim 1, wherein the pipe clamp is a pipe saddle clamp.

14. The pipe clamp according to claim 1, wherein the main pipe is constructed from a plastic material.

15. The pipe clamp according to claim 1, wherein the bearing elements are formed in one piece with the saddle member.

16. The pipe clamp according to claim 1, wherein the extension arranged on the clamping lever is formed as a separate part from the clamping lever.

17. The pipe clamp according to claim 1, wherein the brackets are configured to engage round the bearing bolts.

18. The pipe clamp according to claim 11, wherein the band ends are screwed, riveted and/or clamped on the band linkage and the clamping lever.

* * * * *